US 7,292,608 B1

(12) United States Patent
Nowell et al.

(10) Patent No.: US 7,292,608 B1
(45) Date of Patent: Nov. 6, 2007

(54) METHOD AND APPARATUS FOR TRANSFERRING SYNCHRONOUS OPTICAL NETWORK/SYNCHRONOUS DIGITAL HIERARCHY(SONET/SDH) FRAMES ON PARALLEL TRANSMISSION LINKS

(75) Inventors: Mark C. Nowell, Stittsville (CA); Gary Nicholl, Kanata (CA); Jean-Yves Ouellet, Ottawa (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/484,961

(22) Filed: Jan. 18, 2000

Related U.S. Application Data

(60) Provisional application No. 60/168,049, filed on Nov. 30, 1999.

(51) Int. Cl.
*H04J 3/07* (2006.01)

(52) U.S. Cl. .................. 370/506; 370/512; 370/536; 370/907

(58) Field of Classification Search ............ 370/463, 370/471, 472, 473, 474, 475, 476, 503–514, 370/535–542, 907, 395.51; 714/752, 758
See application file for complete search history.

(56) References Cited

U.S. PATENT DOCUMENTS

| 4,486,739 | A |   | 12/1984 | Franaszek et al. |
|---|---|---|---|---|
| 4,957,340 | A |   | 9/1990 | Kirkby |
| 5,161,153 | A |   | 11/1992 | Westmore |
| 5,416,772 | A |   | 5/1995 | Helton et al. |
| 5,455,832 | A |   | 10/1995 | Bowmaster |
| 5,461,622 | A | * | 10/1995 | Bleickardt et al. .......... 370/470 |
| 5,537,447 | A |   | 7/1996 | Urbansky |
| 5,541,931 | A | * | 7/1996 | Lee ............................ 370/535 |
| 5,568,486 | A | * | 10/1996 | Huscroft et al. ......... 370/395.2 |
| 5,570,356 | A | * | 10/1996 | Finney et al. ............... 370/476 |
| 5,579,323 | A |   | 11/1996 | Krisher |
| 5,715,248 | A |   | 2/1998 | Lagle, III et al. |
| 5,793,770 | A |   | 8/1998 | St. John et al. |
| 5,841,760 | A | * | 11/1998 | Martin et al. ............... 370/242 |
| 6,122,281 | A | * | 9/2000 | Donovan et al. ........... 370/401 |
| 6,167,077 | A | * | 12/2000 | Ducaroir et al. ............ 375/219 |
| 6,430,201 | B1 | * | 8/2002 | Azizoglu et al. ........... 370/535 |
| 6,636,529 | B1 | * | 10/2003 | Goodman et al. .......... 370/469 |

OTHER PUBLICATIONS

Hanks et al, Proposal for a Very Short Reach (VSR) OC-192/STM-64 Interface based on Parallel Optics, OIF-99.120, pp. 1-10, Oct. 1999.*

Fujimoto et al, Skew-Free Parallel Optical Transmission System, IEEE, pp. 1822-1831, Oct. 1998.*

Fujimoto et al, Skew-Free Parallel Optical Transmission Systems, IEEE, pp. 1822-1831, OCt. 1998.*

(Continued)

*Primary Examiner*—Frank Duong
(74) *Attorney, Agent, or Firm*—Hamilton, Brook, Smith & Reynolds P.C.

(57) ABSTRACT

The present invention relates to methods and systems for transferring SONET/SDH frames between nodes by mapping the SONET/SDH frames onto individual channels of data and transferring the SONET/SDH frames over parallel transmission links. More particularly, the methods for transferring SONET/SDH frames includes transmitting SONET/SDH frames and receiving SONET/SDH frames using a transceiver module.

68 Claims, 7 Drawing Sheets

OTHER PUBLICATIONS

Shimada et al, GaAs 10 Gb/s 64:1 Multiplexer/Demultiplexer Chip Sets, IEEE, pp. 503-511, Apr. 1996.*

Yano et al, Skew-Free Parallel Optical Links and their Array Technology, IEEE, pp. 552-564, 1995.*

Yoshikawa et al, Skewless Optical Data-Link Subsystem for Massively Parallel Processors Using 8 Gb/s ×1.1 Gb/s MMF Array Optical Module.*

Yoshikawa et al, Gbyte-Class Skewless Parallel-Optical-Data-Link Subsystem, IEEE, pp. 63-64, 1996.*

* cited by examiner

| Code group name | Octet Value | Current RD− abcdei fghj | Current RD+ abcdei fghj |
|---|---|---|---|
| K28.5 | BC | 001111 1010 | 110000 0101 |
| D3.1[a] | 23 | 110001 1001 | 110001 1001 |
| D21.2[a] | 55 | 101010 0101 | 101010 0101 | a. Both D3.1 and D21.2 have neutral mark/space density.

FIG. 5

Note: D3.1 and D21.2 have neutral running disparity to ensure that two K28.5's have opposite disparity.
D3.1 and D21.2 are used as the channel identifiers

METHOD AND APPARATUS FOR TRANSFERRING SYNCHRONOUS OPTICAL NETWORK/SYNCHRONOUS DIGITAL HIERARCHY(SONET/SDH) FRAMES ON PARALLEL TRANSMISSION LINKS

RELATED APPLICATIONS

This application claims the benefit of U.S. Provisional Application No. 60/168,049 filed on Nov. 30, 1999, the entire teachings of which are incorporated herein by reference.

BACKGROUND OF THE INVENTION

Synchronous Optical Network (SONET) is an industry standard for high-speed transmission over optical fiber. The SONET standard, as formulated by the Exchange Carriers Standards Association (ECSA) for the American National Standards Institute (ANSI), is herein incorporated by reference in its entirety. SONET defines a technology for carrying many signals of different capacities through a synchronous, flexible, optical hierarchy. Synchronous Digital Hierarchy (SDH) is a standard technology for synchronous data transmission on optical media. SDH is the international equivalent of SONET. Both technologies provide faster and less expensive network interconnection than traditional plesiochronous (almost synchronous) digital hierarchy (PDH) equipment. In digital transmission systems, synchronous means the bits from one call, for example in digital telephone transmission, are carried within one transmission frame.

Frame structures specify the distinctive, and usually cyclic, arrangement of timeslots in a transmission line for the purpose of identifying individual timeslots in a frame of information. Frame structures are also called framing formats. Framing is a method of indicating where to begin counting channels so for example, a demultiplexer knows where to start counting channels. Framing of digital signals accounts for the need to synchronize and identify data bits at four levels: bit level, byte level, frame level and system or network level. The information transmitted is composed of individual data bits. Error-free performance depends on the precise control of the bit rates throughout a network. Information is processed at the byte level (unique strings or groups of 8-bit words) by digital cross-connect and switching systems. In order for these systems to identify unique strings of bits, the serial data stream must include frame synchronization. A frame usually includes a number of data bytes.

The basic rate for SONET is 51.85 Million bits per second (Mbps) to permit more bandwidth for operation, administration and maintenance functions than the previous plesiochronous Digital Hierarchy (PDH) technology. SONET is based on the Synchronous Transport Signal level-1 or STS-1 frame which consists of 810 octets (9 rows of 90 octets). The STS-1 is a specific sequence of 810 bytes (6480 bits), which includes various overhead bytes and an envelope capacity for transporting payloads. For example, the bytes A1 and A2 are framing bytes which indicate the beginning of an STS-1 frame. The STS-1 frame is transmitted top to bottom, row by row, from left to right. The STS-1 frame is transmitted every 125 µs (8000 frames per second), thus resulting in a transmission rate of 51.84 Mbps. SONET STS-n frames are mapped onto the optical equivalent OC-n where OC stands for optical carrier. SONET data transmission rates are often given by OC-n, for example OC-1 corresponds to an optical line rate of 51.84 Mbps, and OC-48 corresponds to 2,488.32 Mbps.

SDH uses the Synchronous Transport Modules (STM) and rates for example, STM-1 operates at a speed of 155 Mbps, STM-4 operates at a speed of 622 Mbps, STM-16 operates at a speed of 2.5 giga bits per second (Gbps), and STM-64 operates at a speed of 10 Gbps. The STM-1 basic frame consists of 2430 octets (270×9) or 9 sets of timeslots with each set having 270 timeslots. Within a time slot interchange unit, a STM-1 frame is converted into a matrix of data bytes with each row being a set of timeslots and a column consisting of all occurrences of an individual timeslot in all rows. The resultant matrix has 9 rows and 270 columns. The STM-1 frame consists of a section overhead (SOH), of approximately 5.184 Mbps and a payload of 150.336 Mbps. The SOH of the STM-1 frame is reserved for SDH management, while the payload contains the information to be transmitted by customers.

For each defined rate, a portion of each data frame is dedicated to overhead with the balance being available for data payload. For example, for STS-1, the payload capacity is 49.536 Mbps.

SONET/SDH compliant fiber-optical facilities are being installed by corporations for backbone networks, as well as by carriers and competitive access providers for long-haul routes and fault-tolerant rings around major metropolitan areas. SONET/SDH combines bandwidth and multiplexing capabilities, allowing users to fully integrate voice, data, and video over a single fiber-optic facility. SONET/SDH technology standardized line rates, coding schemes, bit-rate hierarchies, operations and maintenance functionality.

As interface speeds increase, so too does the cost of optical modules. For example, at OC-192, having a line rate of 9.953 Gbps, the cost of the traditional optical transceiver modules is very high. These modules are often required to only transmit data very short distances (i.e. router to router or router-to-dense wavelength division multiplexing (DWDM) terminal within a central office) and do not need to be as highly specified as they would be if transmitting over long distances. Parallel optical transmission modules have recently become available on the market. Their main target is to address the board-to-board or rack-to-rack interconnection.

SUMMARY OF THE INVENTION

The method and apparatus of the present invention relates to transferring SONET/SDH frames using parallel transmission links over relatively short distances such as router to router or router to DWDM terminals. The method includes mapping SONET/SDH frames onto parallel channels of data and transferring the SONET/SDH frames over parallel channels.

The methods for transmitting the SONET/SDH frames over a parallel transmission system include the steps of determining the position of SONET/SDH frame markers, byte stripping the bytes of the SONET/SDH frames onto parallel data channels, encoding each data channel, and frame delimiting each channel before transmitting the data channels over parallel links. The parallel transmission system can comprise a parallel optics based transmission link, a wavelength division multiplexed (WDM) based transmission link, or a parallel electrical based transmission link. In a particular embodiment, the parallel-optics based transmission link uses 12 fibers.

The methods further include receiving the SONET/SDH frames over the parallel transmission system using the steps of recovering data from each transmission link; decoding each data channel; realigning the individual channels to compensate for any inter-channel skew; and recombining the data channels into a SONET/SDH frame.

In a preferred embodiment, the method further includes a loss of synchronization condition on a channel if a plurality of code word violations occur. The method includes the steps of detecting and correcting errors in the data channels by, for example, in a preferred embodiment, calculating a cyclic redundancy check (CRC) for a block of data on each data channel and a protection channel, comparing it to a corresponding separately transmitted CRC for the block and recovering the data for the channel from the protection channel if the CRC's do not match. A source synchronous clocking scheme is used by the method to transfer SONET/SDH frames on parallel transmission systems.

A preferred embodiment of the present invention features a transceiver module for transferring SONET/SDH frames between nodes. The transceiver module includes a converter circuit, a parallel transmit optic module and a parallel receive optic module.

In a preferred embodiment the rate of SONET/SDH frames corresponds to OC-192 line rate. However, the method and apparatus of the present invention is not limited to OC-192 SONET/SDH frames and is applicable to transmitting any rate SONET/SDH frames over a parallel transmission system.

The above and other features and advantages of the method and apparatus for transferring SONET/SDH frames on parallel transmission links including various novel details of construction and combinations of parts will be more particularly described with reference to the accompanying drawings in which like reference characters refer to the same parts throughout the different views and pointed out in the claims. The drawings are not necessarily to scale, emphasis instead being placed upon illustrating the principles of the invention. It will be understood that the particular system and methods embodying the invention are shown by way of illustration only and not as a limitation of the invention. The principles and features of this invention may be employed in varied and numerous embodiments without departing from the scope of the invention.

BRIEF DESCRIPTION OF THE DRAWINGS

FIG. 5 is a diagram illustrating the transmission format in accordance with the present invention.

DETAILED DESCRIPTION OF THE INVENTION

The present invention is related to methods and apparatus for transferring SONET/SDH frames over parallel transmission links. Each link refers to a physical connection between a transmitter and a receiver.

Figure 1:
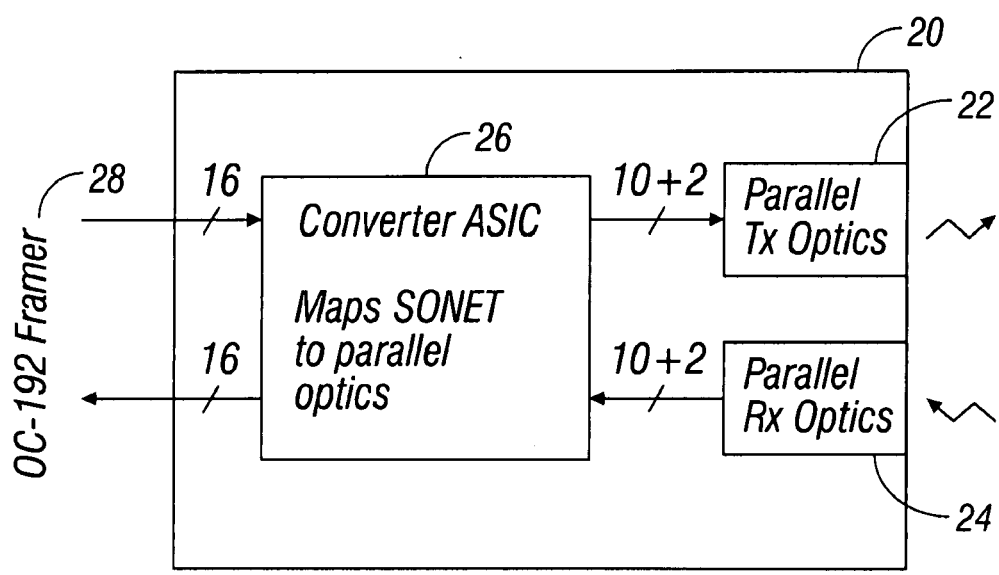
FIG. 1 illustrates a preferred embodiment of a transceiver module for transferring SONET/SDH frames on parallel transmission links.

Referring to FIG. 1, in a preferred embodiment, the transceiver module 20 in accordance with the present invention is a bidirectional device with an electro-optic transmitter and a receiver used to provide a low-cost physical layer interconnect for OC based systems, such as for example, the OC-192 based systems. The module contains parallel optical transmit 22 and receive 24 sub-modules as well as a converter chip 26 to ensure byte and channel alignment and interface between the optical sub-modules 22,24 and a OC-192 framer chip 28. The converter chip 26 adapts the incoming signals into a format that allows them to be transmitted on a parallel optic link and realigned after transmission. Each optical sub-module (optical transmit 22 and receive 24) comprises a connector interface on the electrical ports and an MTP (MPO) connector interface on the optical ports. It should be noted that the parallel optical transmit module 22 can be integral with the optical receive module 24.

The transceiver module 20 can be used for a low-cost router to router interconnection within a central office. Additionally, the module may be used to interconnect a router with a DWDM terminal where only short distance links are necessary.

The converter chip 26 is an application specific integrated chip (ASIC) designed to interface between the OC-192 framer chip 28 and the optical submodules 22, 24. In a particular embodiment, in the transmit direction, the transceiver module 20 receives a 16-bit wide Low Voltage Differential Signal (LVDS) having a rate of 622 Mb/s from the OC-192 framer chip 28. It should be noted that though the preferred embodiment is disclosed with respect to LVDS signal levels, other embodiments can include other signal levels. The converter chip 26 transforms the 16 bit signals on the parallel bus to 10 parallel channels. The converter chip 26 generates two additional channels. The eleventh channel is a protection channel which provides protection against a single channel failure. If any of the ten channels fail, the data in the errored block can be recovered at the receiver using the protection channel, by performing an exclusive or (XOR) operation on the other nine non-errored channels and the protection channel. The final (twelfth) channel is an error detection channel (EDC) which in a preferred embodiment carries a set of Cyclic Redundancy Checks (CRC's) for each of the other 11 channels. The twelfth channel is used to determine whether any errors occurred during transmission. The details of the error detection and correction method are described hereinafter.

Each channel is encoded and certain SONET framing bytes on each channel are overwritten with a frame marker consisting of characters defined for the code. The purpose of the frame markers is to aid the de-skewing circuitry at the receiver end as framing allows the receiver to realign the frames. The 12 channels are passed to the optical transmitter module 22 which transmits the data along the 12 optical fibers in a ribbon fiber. The bit rate of the ribbon cable is 1.244 Gb/s. The transceiver module 20 synthesizes the required high speed clock from a 622 MHZ input clock. The transmit data interface is forward timed.

In the receive direction, the transceiver module 20 receives 12 parallel optical signals on a fiber ribbon with an MTP (MPO) connector. The data streams on the ribbon cable operate at 1.244 Gb/s. The optical receive sub-module 24 converts the signal to an electrical equivalent and it is then transmitted to the converter chip 26. The converter chip 26 recovers the clock and decodes each channel. It then deskews the individual channels, by using the frame markers as delimiters, to compensate for any inter-channel skew that may occur due to propagation delay differences in the transmit 22 and receive 24 optical sub-modules as well as the fiber ribbon. The converter chip 26 then transforms the 10-bit wide data to 16-bit wide data and replaces the SONET framing bytes previously removed. The converter chip can auto-detect whether the ribbon fiber patchcord has a crossover and internally accounts for this to ensure correct data byte ordering at the output.

If the converter chip 26 detects a loss of synchronization (LOSyn) on any single channel within the 10 data channels, it recovers the contents of that channel from the protection channel. Thus, a single channel failure can be detected and protected before any SONET alarms are triggered. The loss of synchronization sequence of steps is based on detecting invalid 8B/10B codewords. If it detects LOSyn from more than one channel in the group of 10 data channels, it overwrites the output of all channels with all zeros until valid data is transmitted and synchronization is achieved. Additionally, the receiver calculates the CRCs for blocks of data on each channel. If the calculated CRC does not match the corresponding transmitted CRC, an error is assumed to have occurred and the errored block is replaced by extracting it from the protection channel. The converter chip 26 provides a 16 bit parallel LVDS signal having a rate of 622 Mb/s for connection to the OC-192 framer chip 28 retimed with a 622 MHZ output clock.

Figure 2:
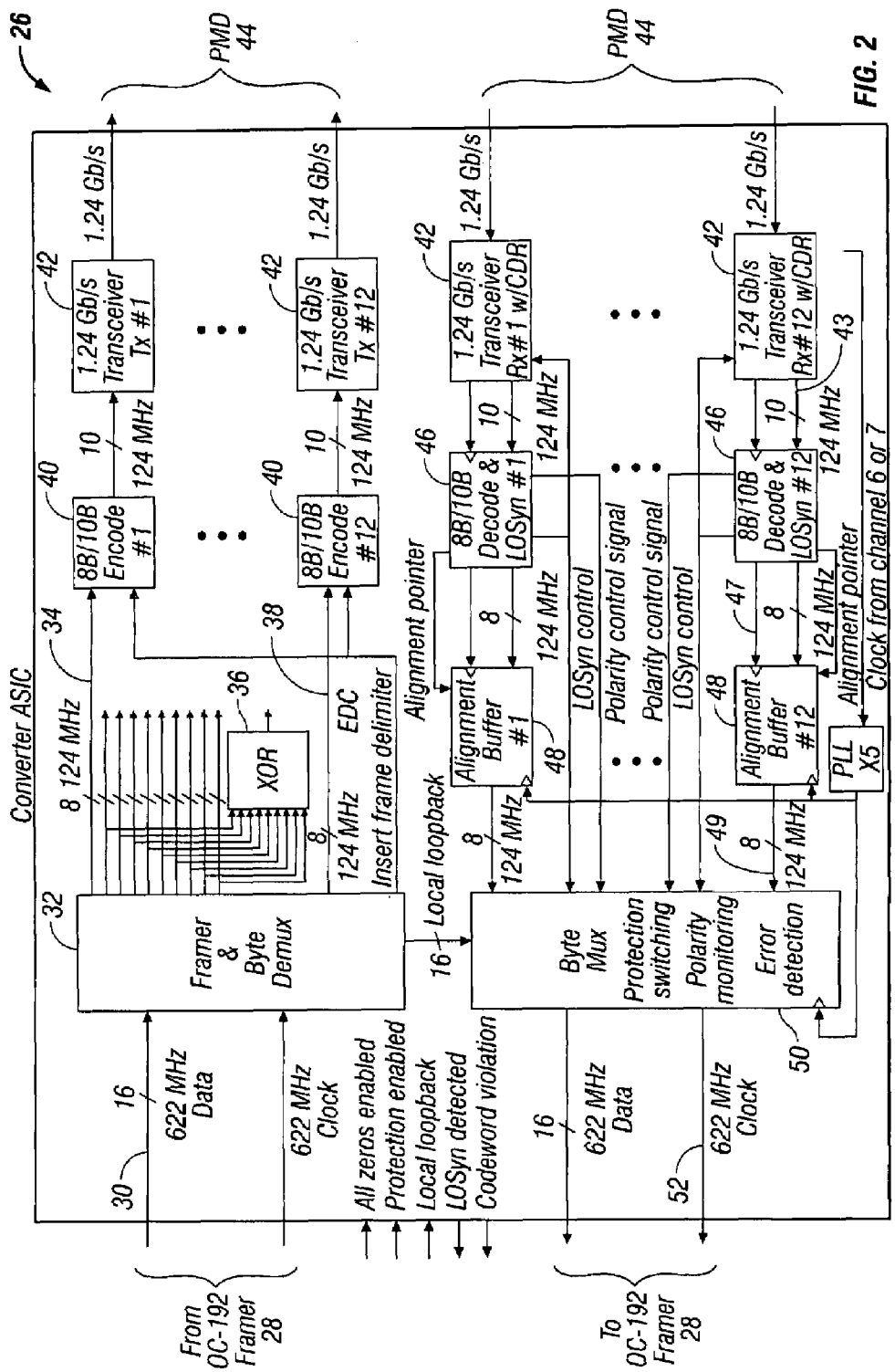
FIG. 2 is a schematic diagram of a converter chip included in the transceiver module shown in FIG. 1.

Referring to FIG. 2, in the transmit direction, the 16 bit wide LVDS signal 30 at a rate of 622 Mb/s from the external SONET framer chip 28 passes into a framer and byte demultiplexer module 32. The framer portion of the module 32 determines the position of SONET frame markers in the data stream of the SONET bytes and uses a frame marker to identify the position for subsequent processing of the data. The demultiplexer portion of module 32 outputs N byte-wide channels of data where N is the number of parallel channels needed to transmit the data. In a particular embodiment, N=10. The SONET bytes are mapped byte-wise onto the parallel channels, for example, channel 34. A protection system is also used that performs an exclusive or (XOR) operation on all the data channels. One protection channel 36, and an error detection channel 38 exist resulting in a 12 fiber link.

The framer byte demultiplexer module 32 determines the position of the frames. At a later stage, each channel is frame delimited. The SONET frame delimiters are determined so that a framing pulse is generated.

The frame delimiters are created by overwriting the first three SONET A1 or framing bytes on each link with predetermined frame delimiter bytes. The position of the first three A1 bytes is known because of the SONET framer logic. At the receiver they are rewritten with the SONET A1 bytes. The predetermined frame delimiter bytes consist of three 8B/10B codewords (K28.5, D3.1 or D21.2, and K28.5). This pattern ensures that at least one comma character (embedded within the K28.5) exists on each channel's frame delimiter.

In the preferred embodiment of the present invention there are differing frame delimiters for one half of the channels as compared to the other half. For example, channels 1 through 6 have the D3.1 codeword in the frame delimiter and channels 7 through 12 have the D21.2 codeword in the frame delimiter. Different delimiters are chosen because there is no defined way to terminate a ribbon cable. It could be terminated either straight through or with a 180 degree twist. This results in the possibility of connecting channel 1 in the transmitter to channel 12 in the receiver or of connecting channel 1 in the transmitter to channel 1 in the receiver. To ensure that the system is robust, different frame delimiters are used for the two halves of the channels so that the receiver can determine if a reversal has occurred and compensate for it.

Each channel is encoded in an encoder 40 using a block-code. In a preferred embodiment, 8 bits of information on each data channel that is output from the framer and demultiplexer module 32 is translated into 10 bits for transmission (8B/10B) code. A byte oriented DC balanced 8B/10B partitioned block transmission code is described in U.S. Pat. No. 4,486,739 filed on Jun. 30, 1982 and issued on Dec. 4, 1984, the contents of which are incorporated herein by reference. The coding ensures acceptable transmission format for the Physical Media Dependent (PMD) devices 44. The coding allows specific control characters to be used as frame delimiters and also allows error detection by monitoring for invalid codewords at the receiver. Even though disclosed with respect to an encoder, other embodiments of the present invention can include scramblers for changing the transmission format.

The output signals from the encoder 40 form an input into the ASIC transceiver 42 which takes the 10 bit parallel inputs and outputs a data channel with a serial rate of 1.24 Gb/s. The data then forms an input to the PMD's 44.

In the receive direction, each signal is received from the PMD 44 and forms an input into a ASIC transceiver 42. The input into the transceiver 42 is received at a serial rate of 1.24 Gps. The transceiver 42 deserializes the data to produce an output of 10 bits. The transceiver 42 also performs clock and data recovery. To enable synchronization and determination of the first bit, a comma detect is embedded in the transceiver 42. Word alignment is achieved on each channel by detecting the comma character in the frame delimiter. Each channel is monitored to detect codeword violations. If many codeword violations occur, a loss of synchronization (LOSyn) condition is asserted on the channel and the protection channel is used to recover the data on the lost link. If more than one data channel generates a LOSyn, it is not possible to recover the data from the protection channel and all the data is overwritten with zeros to indicate to the SONET equipment that there is a failure.

Each 10 bit data channel, for example channel 43, is decoded in decoder 46 and the frame delimiter positions are detected. In a preferred embodiment, a 8B/10B decoder is used. Thus, the 10 bit data stream is decoded to an 8 bit data stream of information. Each channel, for example channel 47, is forwarded to an alignment buffer 48 that is used to deskew all the channels by ensuring that the position of the data in the buffer is known relative to the frame delimiter. The alignment buffer 48 functions as a First In/First Out (FIFO) buffer. Data is clocked in with one clock and clocked out with another.

When all the channels are aligned, for example channel 49, they are forwarded onto a byte multiplexer module 50 that overwrites the SONET A1 framing bytes back into the bytes that were used by the channel frame delimiters. The polarity of each channel is also checked to determine if a channel reversal has occurred due to the ribbon connector and if it has, the channel reversal is undone.

The clocking system of the present invention in the transmit and receive direction includes a 622 MHZ clock 52. In the transmit direction, the clock 52 has for an input the plurality of 16-bit input channels 30. The conversion from a single 16-bit channel to ten 8 bit wide channels results in a 622 to 124.4 MHZ conversion of the clock 52. Each 8 bit wide channel then is changed to channels that are 10 bits wide after the 8B/10B conversion in the encoder 40, and each standard transceiver block 42 outputs a single 1.244 Gb/s data stream. In the receive direction, each 1.244 Gb/s data stream is converted by a transceiver 42 to data streams having a rate of 124.4 MHZ. The data rate is then multiplied by 5 to provide the 622 MHZ clock output needed by the framer 28.

Figures 3, 4:
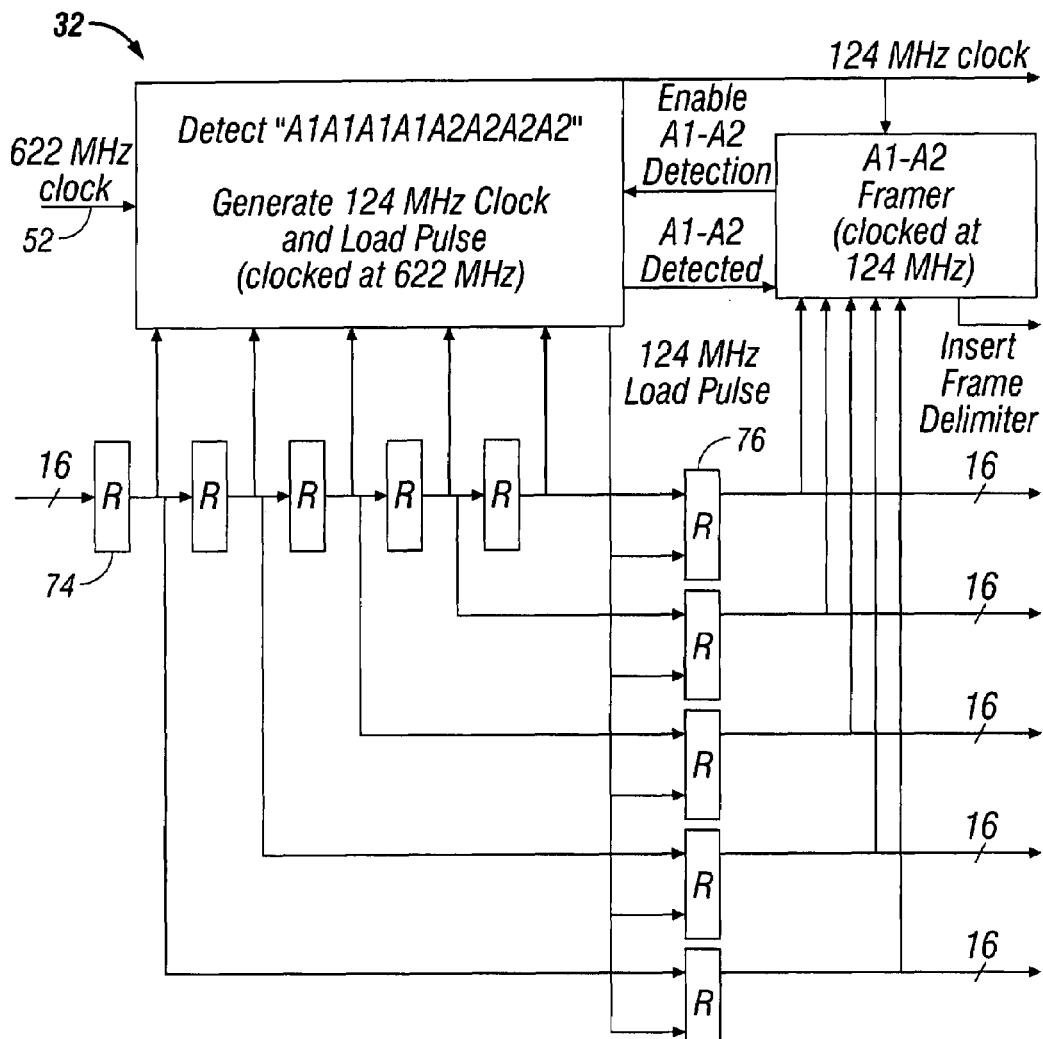
FIG. 3 is a tabulation of the specific characters used in the frame delimiters in accordance with the present invention.
FIG. 4 is a schematic diagram illustrating the framer and byte demultiplexer in accordance with the present invention.

The converter chip 26 uses certain codewords for frame delimiters as discussed herein before. The specific characters used in the frame delimiters are shown in FIG. 3. The corresponding running digital sum or disparity values 70 are shown for each octet value 72.

FIG. 4 illustrates a preferred embodiment of the framer and byte demultiplexer module 32. The 16 bit LVDS signal that is input in the framer/demultiplexer 32 is put into five registers such as register 74. The data is then clocked into vertical rows of registers such as register 76. Effectively the framer/demultiplexer 32 takes the input at five times the speed and outputs data on ten channels.

Figure 5:
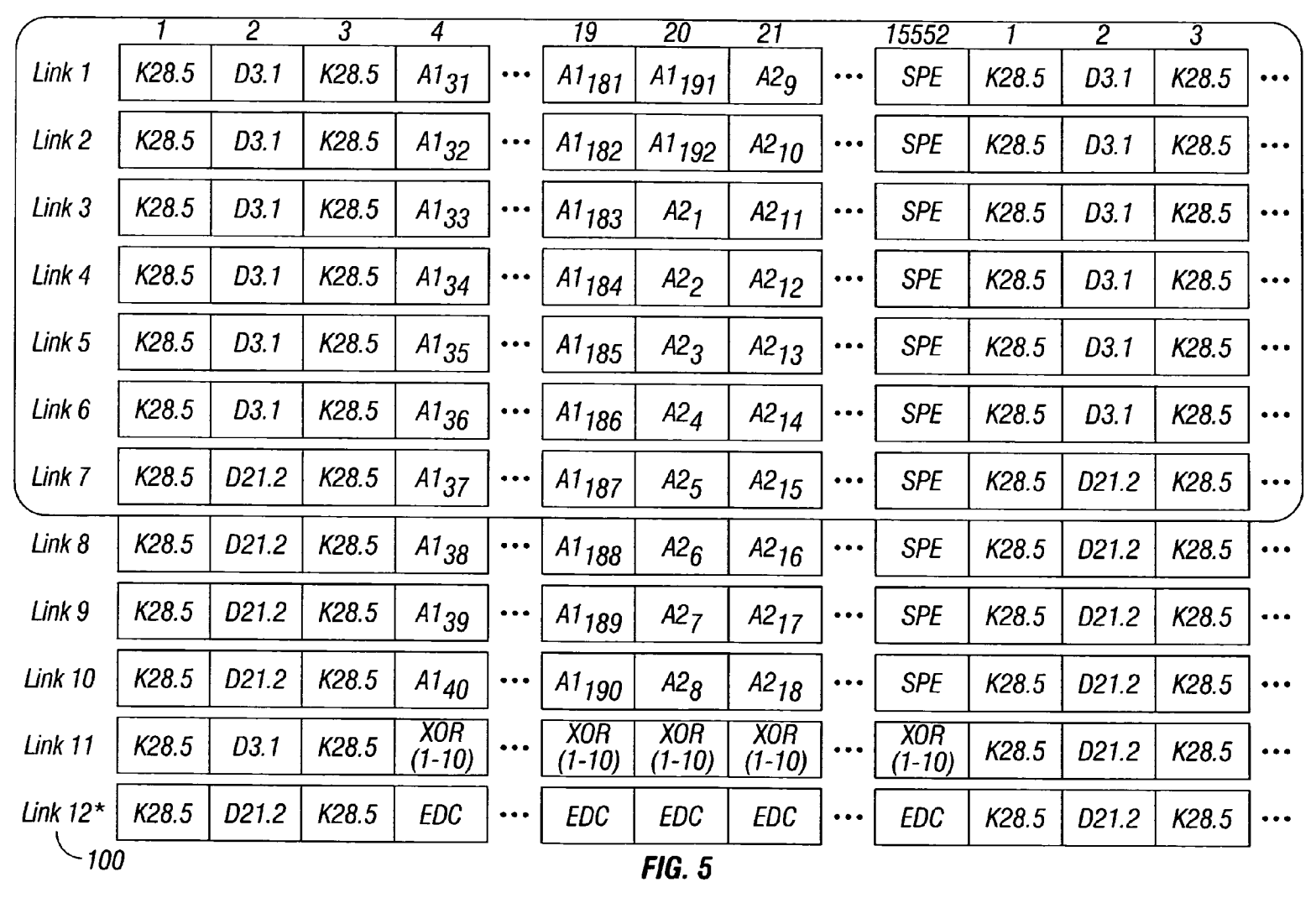
Figure 6:
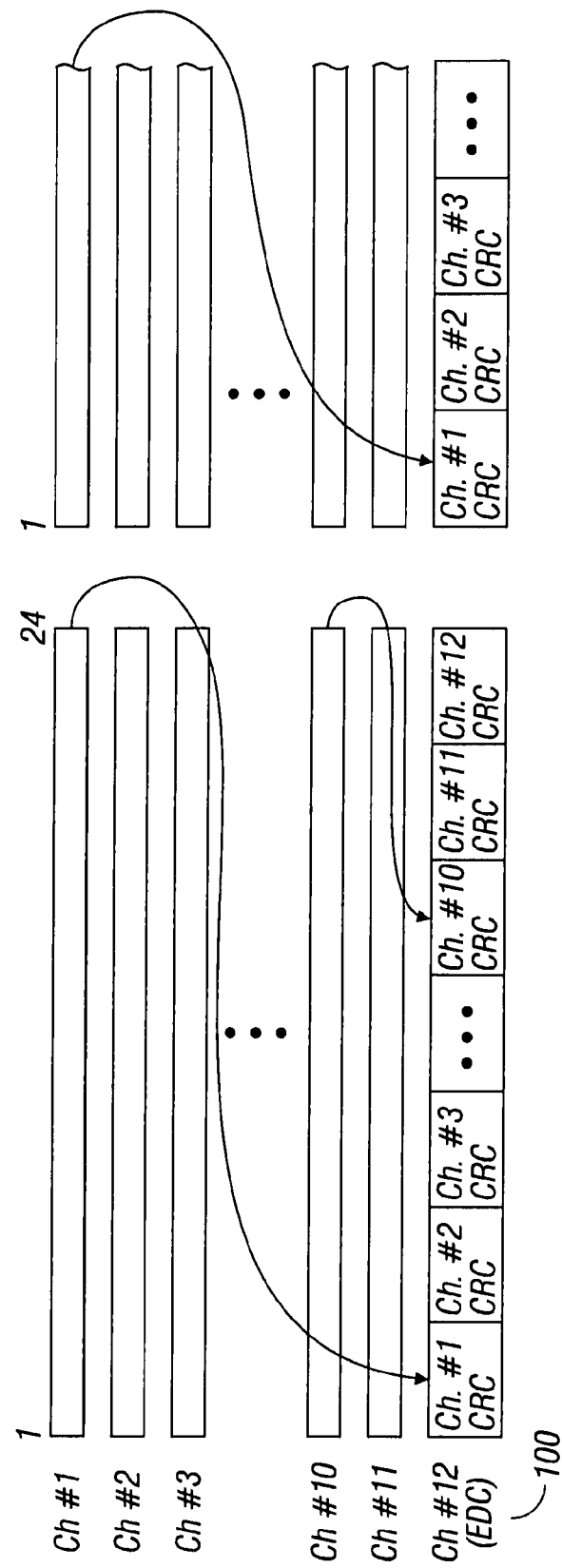
FIG. 6 is a diagram illustrating the error detection channel format in accordance with the present invention.

Referring to FIGS. 5 and 6, the transmission format on the parallel transmission links showing the frame delimiters and the payloads and the format of error detection channel is illustrated. The frame delimiters are not exclusive OR'ed. The twelfth channel or link 100 is called the "Error Detection Channel" (EDC). This channel carries CRC information for the other eleven channels that the receiver can use to detect and correct transmission errors. The data in each channel is divided into 'virtual blocks' of 24 bytes. The first virtual block of a frame is aligned with the frame delimiter to ensure consistent wrap-around. A 16-bit CRC is calculated for each virtual block in each channel. The eleven (10 data channels plus one protection channel) 16-bit CRC's are then transmitted serially in the EDC, within the corresponding 24 byte virtual block on the EDC. The final two bytes of the EDC channel's virtual block contain its own 16-bit CRC calculated over the other eleven 16-bit CRCs.

As described hereinbefore, all 12 channels are 8B/10B encoded. If a frame pulse is present, the first three SONET A1 bytes on each channel are overwritten with codewords that form a frame delimiter. In a preferred embodiment, the frame delimiters for channels 1-6 and channels 7-12 are different to allow detection of the polarity of the patchcord (and therefore channel order) at the transreceiver 42.

Figure 7:
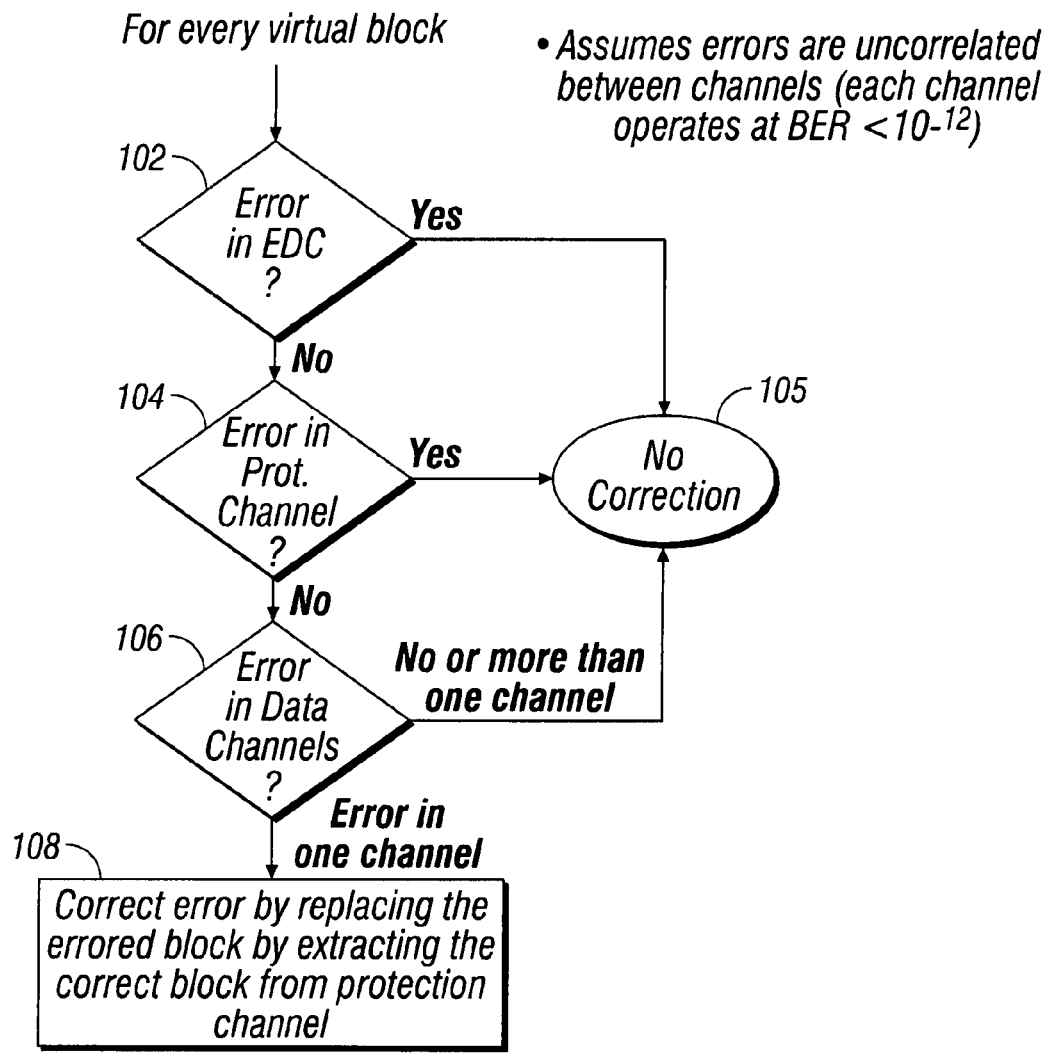
FIG. 7 is a flow chart illustrating the error correction method in accordance with the present invention.

Referring to FIG. 7, a flowchart illustrating the error correction method in accordance with the present invention is illustrated. For every virtual block of each channel (1-12), per step 102 error in the error detection channel is examined. If there is an error detected in the EDC, then no correction is performed per step 105. If no EDC error is detected, then per step 104 errors in the protection channel are examined. Again, per step 105, no correction is performed if an error in the protection channel is detected. Per step 106, error in the data channels is examined. If no errors are detected or errors are detected in more than one channel, no correction is performed per step 105. However, if error in one data channel is detected, the correct data is recovered for the errored channel by performing an exclusive or (XOR) operation on the other nine non-errored channels and the protection channel per step 108. An XOR operation is performed using the protection channel and the other nine correct blocks to result in the correct block from the protection channel.

Figure 8:
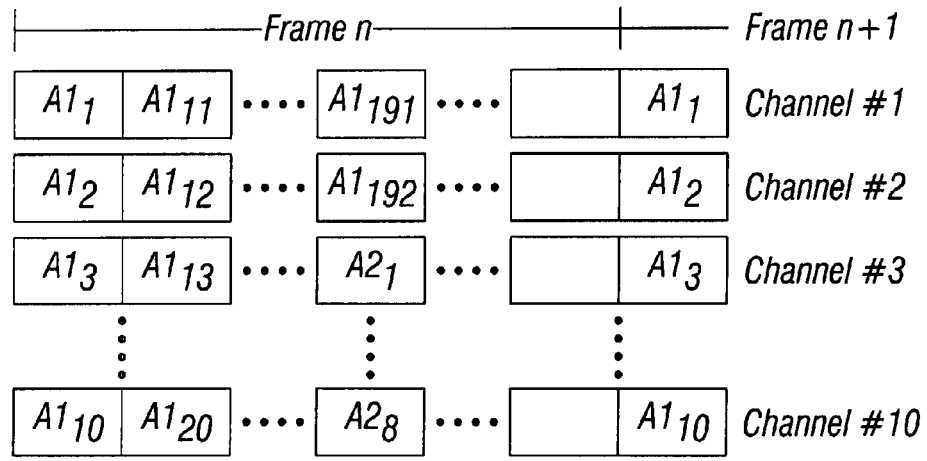
FIG. 8 is a diagram illustrating the framing format in accordance with the present invention.

FIG. 8 illustrates the framing format in accordance with the present invention. The SONET frame bytes are byte stripped across the 10 data channels. Each channel is 8B/10B encoded to control transmission properties.

Figure 9:
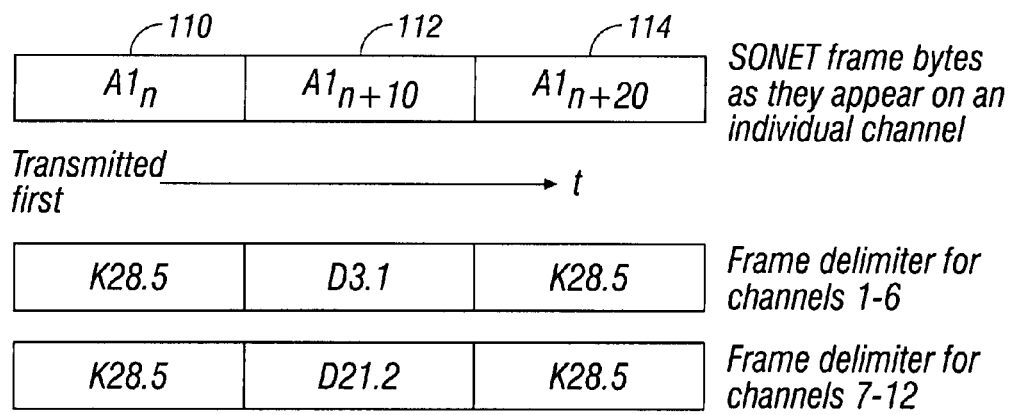
FIG. 9 is a diagram illustrating the format of the frame delimiter on individual channels of the parallel optic link in accordance with the present invention.

Referring to FIG. 9, the frame delimiters are illustrated. The first A1 frame 110 is overwritten by a K28.5, the second A1 frame 112 is overwritten by D3.1 or D21.2 depending on the channel number and the third A1 frame 114 is overwritten by a K28.5. Because of the neutral running disparity of the second codeword of the delimiter, the K28.5 in the third codeword of the delimiter shall have the opposite running disparity to the first. This ensures that one comma will be inserted at the beginning of each frame. The 10 bit wide data channels are then forwarded to the transceiver blocks 42 that serialise the data into a 1.244 Gb/s LVDS output signal that interfaces directly with the optical transmit submodule 22. The internal 124.4 MHZ and 1.244 GHz are synthesized from the input 622.08 MHZ clock.

In the receive direction, the twelve 1.244 Gb/s parallel LVDS signals are received from the optical receive submodule 24 by the transceivers 42. As described herein before, the transceivers 42 perform clock and data recovery and deserialise each data channel into a 10-bit wide data path.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for transferring synchronous optical network/synchronous digital hierarchy (SONET/SDH) frames between a first and second node comprising:
    a demultiplexer to map frame markers used to generate framing pulses and frame bytes of a SONET/SDH frame onto a plurality of data channels;
    an encoder to encode and translate the frame markers and frame bytes on each data channel for transmission;
    a first de-skewing processor to overwrite the frame markers on the SONET/SDH frame with unique frame markers to aid in de-skewing the plurality of data channels and to maintain the framing pulses;
    a second de-skewing processor to de-skew the data from the plurality of data channels based on the unique frame markers and to restore the frame markers on the SONET/SDH frames to recover the framing pulses;
    a decoder to decode and translate the framing markers and frame bytes on each data channel for reception; and
    a multiplexer to map the plurality of data channels and the recovered framing pulses onto the SONET/SDH frame.

2. The system of claim 1 wherein the demultiplexer includes a framer to determine the position of frame markers in the data.

3. The system of claim 1 wherein the first and second node communicate over parallel transmission links.

4. The system of claim 3 wherein the parallel transmission links comprise a parallel-optics based transmission link.

5. The system of claim 3 wherein the parallel transmission link comprises a wavelength division multiplexed (WDM) based transmission link.

6. The system of claim 1 wherein the encoder or the demultiplexer overwrites the frame markers on each channel with the unique frame markers used for automatic skew compensation.

7. The system of claim 6 wherein the unique frame markers are different for each channel.

8. The system of claim 7 further including a ribbon patchcord with multiple optical fibers on which the data channels are transmitted between the encoder and decoder, and wherein the unique frame markers are used to detect if the optical fibers cause a crossover between or among the channels.

9. The system of claim 8 further including an aligner that re-orders the channels based on the unique frame markers to compensate for a crossover of optical fibers in the ribbon patchcord.

10. The system of claim 8 further including an aligner that re-orders data on the channels as a function of the unique frame markers.

11. The system of claim 1 further including an aligner that de-skews individual channels by using the unique frame markers as delimiters to compensate for inter-channel skew that occurs due to propagation delay differences between or among the channels.

12. The system of claim 1 wherein the data channels are logically combined in such a manner to enable recovery of a single data channel and the logically combined channel exists as a separate data channel.

13. The system of claim 1 wherein a further channel carries bits used for error correction for the plurality of data channels.

14. A method of transferring synchronous optical network/synchronous digital hierarchy (SONET/SDH) frames between a first and second node comprising:
   mapping frame markers used to generate framing pulses and frame bytes of a SONET/SDH frame onto a plurality of data channels;
   overwriting the frame markers on the SONET/SDH frame with unique frame markers to aid in de-skewing the plurality of data channels and to maintain the framing pulses; and
   transferring the SONET/SDH frame over a plurality of parallel transmission links.

15. The method of claim 14 wherein transferring the SONET/SDH frame over parallel transmission links includes transmitting and receiving the SONET/SDH frame over parallel transmission links.

16. The method of claim 15 includes byte stripping bytes of the SONET/SDH frame onto parallel data channels.

17. The method of claim 15 further comprising encoding each data channel for data formatting.

18. The method of claim 15 further comprising framing each data channel.

19. The method of claim 14 wherein the parallel transmission links comprises a parallel-optics based transmission link.

20. The method of claim 19 wherein the optical transmission link comprises at least 12 fibers.

21. The method of claim 14 wherein the parallel transmission links comprises a wavelength division multiplexed (WDM) based transmission link.

22. The method of claim 14 wherein the rate of SONET/SDH frame corresponds to an OC-192/STM-64 line rate.

23. The methods of claim 15 wherein receiving SONET/SDH frame further comprises, receiving data from each of the parallel transmission links; decoding each data channel; realigning each data channel to compensate for an inter-channel skew; and recombining the data channels into a SONET/SDH frame.

24. A method of transmitting synchronous optical network (SONET)/Synchronous digital hierarchy (SDH) frames over a parallel transmission system comprising:
   mapping frame markers used to generate framing pulses and frame bytes of a SONET/SDH frame onto data channels;
   overwriting the frame markers on the SONET/SDH frame with unique frame markers to aid in de-skewing the plurality of data channels and to maintain the framing pulses;
   transmitting the SONET/SDH frame over parallel transmission links.

25. A method of transmitting SONET/SDH frames over a parallel transmission system, a SONET/SDH frame having frame markers used to generate framing pulses and frame bytes, the method comprising:
   determining the position of the frame markers;
   byte stripping bytes of the SONET/SDH frame onto a plurality of parallel of data channels;
   encoding each data channel;
   overwriting the frame markers on the SONET/SDH frame with unique frame markers to aid in de-skewing the plurality of data channels and to maintain the framing pulses; and
   transmitting the channels over parallel transmission links.

26. The method of claim 25, wherein each channel is encoded using a block-code.

27. The method of claim 25 wherein the data channels are logically combined in such a manner to enable recovery of a single data channel and the logically combined channel exists as a separate data channel.

28. The method of claim 25 wherein a further data channel carries cyclic redundancy check (CRC) bits for the plurality of data channels.

29. The method of claim 25 wherein the parallel transmission links comprises a parallel-optics based transmission link.

30. The method of claim 29 wherein the optical transmission link uses at least 12 fibers.

31. The method of claim 25 wherein the parallel transmission links comprises a wavelength division multiplexed (WDM) based transmission link.

32. The method of claim 25 wherein the rate of SONET/SDH frames corresponds to an OC-192/STM-64 line rate.

33. The method of claim 25 wherein overwriting the frame markers on the SONET/SDH frame includes overwriting at least a SONET byte on each data channel.

34. The method of claim 25 wherein at least a first three SONET framing bytes are overwritten on each data channel.

35. The method of claim 25 wherein unique frame markers are used on a subset of the data channels.

36. The method of claim 35 wherein a first frame delimiter is used for a first half of the data channels and a second frame delimiter is used for a second half of the data channels.

37. An apparatus for transmitting SONET/SDH frames over a parallel transmission system, a SONET/SDH frame having frame markers used to generate framing pulses and frame bytes, the apparatus comprising:
   a framer to determine the position of the frame markers;
   a demultiplexer to byte stripe bytes of the SONET/SDH frame onto a plurality of parallel of data channels;
   an encoder to encode each data channel;

a de-skewing processor to overwrite the frame markers on the SONET/SDH frame with unique frame markers to aid in de-skewing the plurality of data channels and to maintain the framing pulses; and a transmitter to transmit the channels over parallel transmission links.

38. A transceiver module for transferring SONET/SDH frames between a first and second node, comprising:

a converter circuit to adapt incoming signals for transmission on parallel transmission links having a first transmission link and at least one second transmission link;

a first de-skewing processor to overwrite first frame markers on the SONET/SDH frame with first unique frame markers to aid in de-skewing first data channels and to maintain framing pulses a parallel transmit optic module to transmit the first data channels on the first parallel transmission link;

a parallel receive optic module to receive second data channels on the at least one second parallel transmission link; and a second de-skewing processor to de-skew the data from the second data channels based on second unique frame markers and to restore the frame markers on the SONET/SDH frames to recover the framing pulses.

39. The transceiver module of claim 38 wherein a line rate for transferring SONET/SDH frames corresponds to an OC-192/STM-64 line rate.

40. The transceiver module of claim 38 wherein the first and second node communicate over the parallel transmission links.

41. The transceiver module of claim 40 wherein the parallel transmission links comprise a parallel-optics based transmission link.

42. The transceiver module of claim 40 wherein the parallel transmission link comprises a wavelength division multiplexed (WDM) based transmission link.

43. The transceiver module of claim 38 wherein the converter circuit interfaces with a framer chip.

44. The transceiver module of claim 38 wherein the parallel transmit optic module is integral with the parallel receive optic module.

45. The transceiver module of claim 38 wherein the de-skewing process is integrated with the converter circuit.

46. The transceiver module of claim 38 wherein the first de-skewing processor and second de-skewing processor are the same processor.

47. A method of transferring SONET/SDH frames over a parallel transmission system comprising:

mapping incoming frames of data having a given number of bits onto a plurality of data channels in a manner supporting de-skewing the data from the data channels without increasing the given number of bits on the data channel and maintaining framing pulses;

de-skewing the data from the data channels based on the mapping; and recovering the framing pulses.

48. The method of claim 47 further including transmitting the data channels via a parallel-optics based transmission link.

49. The method of claim 48 wherein the parallel-optics based transmission link uses at least twelve fibers.

50. The method of claim 47 wherein transmitting the data channels includes wavelength division multiplexing (WDM) the data channels.

51. The method of claim 47 wherein the rate of SONET/SDH frames corresponds to an OC-192/STM-64 line rate.

52. The method of claim 47 further including detecting a polarity of the transmission links by use of unique frame markers on subsets of the data channels.

53. The method of claim 47 further comprising detecting and correcting errors on the data channels by calculating a cyclic redundancy check (CRC) for a block of data on the data channels; comparing the CRC to a corresponding, separately-transmitted CRC for the block; and recovering the data from a protection channel if the CRC's do not match.

54. An apparatus for transmitting synchronous optical network (SONET)/Synchronous digital hierarchy (SDH) frames over a parallel transmission system, the apparatus comprising:

a demultiplexer to map frame markers used to generate framing pulses and frame bytes of a SONET/SDH frame onto data channels;

a de-skewing processor to overwrite the frame markers on the SONET/SDH frame with unique frame markers to aid in de-skewing the plurality of data channels and to maintain the framing pulses; and a transmitter to transmit the SONET/SDH frame over parallel transmission links.

55. A system for transferring synchronous optical network/synchronous digital hierarchy (SONET/SDH) frames, the system comprising:

a demultiplexer to map incoming frames of data having a given number of bits onto a plurality of data channels in a manner supporting de-skewing the data from the data channels without increasing the given number of bits on the data channels and maintaining framing pulses; and a de-skewing processor to deskew the data from the data channels based on the mapped incoming frames and to recover the framing pulses.

56. The system of claim 55 wherein the demultiplexer includes a framer to determine the position of frame markers, used to generate framing pulses, in the data.

57. The system of claim 55 wherein the demultiplexer is in a first node and the de-skewing processor is in a second node, the first and second nodes communicating over parallel transmission links.

58. The system of claim 57 wherein the parallel transmission links comprise a parallel-optics based transmission link.

59. The system of claim 57 wherein the parallel transmission link comprises a wavelength division multiplexed (WDM) based transmission link.

60. A method of receiving SONET/SDH frames over a parallel transmission system comprising:

recovering data from each transmission link;

decoding each data channel;

realigning each data channel based on a unique frame marker to compensate for an inter-channel skew;

restoring the unique frame marker to a frame marker normally on a SONET/SDH frame to recover framing pulses; and recombining the data channels and the recovered framing pulses into the SONET/SDH frame.

61. The method of claim 60, wherein the parallel transmission system comprises a parallel-optics based transmission link.

62. The method of claim 61 wherein the optical transmission link uses at least 12 fibers.

63. The method of claim 60 wherein the parallel transmission system comprises a wavelength division multiplexed (WDM) based transmission link.

64. The method of claim 60 wherein the rate of SONET/SDH frames corresponds to an OC-192/STM-64 line rate.

65. The method of claim 60 wherein the receiver detects a polarity of the transmission links by use of unique frame markers on subsets of the data channels.

66. The method of claim 61 further comprising a loss of synchronization condition on a channel if a plurality of code word violations occur.

67. The method of claim 66 wherein a channel failure is detected using the loss of synchronization condition.

68. The method of claim 60 further comprising detecting and correcting errors on the data channels by calculating a cyclic redundancy check (CRC) for a block of data on the data channels; comparing the CRC to a corresponding, separately-transmitted CRC for the block; and recovering the data from a protection channel if the CRC's do not match.

* * * * *